(12) United States Patent
Cai et al.

(10) Patent No.: US 9,729,407 B2
(45) Date of Patent: Aug. 8, 2017

(54) DISTRIBUTED MEDIA RESOURCES IN VOIP NETWORKS FOR PROVIDING SERVICES

(75) Inventors: Yigang Cai, Naperville, IL (US); Alexander Aihao Yin, QingDao (CN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1803 days.

(21) Appl. No.: 11/934,769

(22) Filed: Nov. 3, 2007

(65) Prior Publication Data

US 2008/0317238 A1   Dec. 25, 2008

(30) Foreign Application Priority Data

Jun. 20, 2007 (CN) .......................... 2007 1 0111907

(51) Int. Cl.
| | | |
|---|---|---|
| *H04M 3/42* | (2006.01) | |
| *H04M 3/436* | (2006.01) | |
| *H04L 12/66* | (2006.01) | |
| *H04L 12/16* | (2006.01) | |
| *H04L 12/28* | (2006.01) | |
| *H04L 12/24* | (2006.01) | |
| *H04L 29/08* | (2006.01) | |
| *H04M 7/00* | (2006.01) | |
| *H04L 29/06* | (2006.01) | |

(52) U.S. Cl.
CPC ........ *H04L 41/5087* (2013.01); *H04L 67/125* (2013.01); *H04L 65/1043* (2013.01); *H04L 65/1063* (2013.01); *H04M 7/006* (2013.01)

(58) Field of Classification Search
CPC ....... H04M 1/722563; H04M 3/42263; H04M 3/42; H04M 3/42042; H04M 3/436; H04M 3/56; H04M 1/2535; H04M 1/247; H04W 88/02; H04W 88/022; H04W 88/04; H04L 65/1066; H04L 65/1096; H04L 65/40; H04L 65/60; H04L 67/30; H04L 67/303; H04L 67/306
USPC .... 370/352, 401, 166, 486, 395.2, 392, 338; 709/219–220; 713/171, 201; 379/93.02, 379/220.01, 265.09, 201.1; 455/466
See application file for complete search history.

(56) References Cited

U.S. PATENT DOCUMENTS

| | | | | |
|---|---|---|---|---|
| 6,640,239 B1 * | 10/2003 | Gidwani | ........................ | 709/203 |
| 7,313,592 B1 * | 12/2007 | Huboi et al. | ................... | 709/203 |
| 7,596,210 B2 * | 9/2009 | Blohm | ........................ | 379/88.22 |

(Continued)

FOREIGN PATENT DOCUMENTS

| | | |
|---|---|---|
| CN | 1742265 | 3/2006 |
| WO | WO2006034563 | 4/2006 |

*Primary Examiner* — Wutchung Chu
(74) *Attorney, Agent, or Firm* — Duft Bornsen & Fettig, LLP

(57) ABSTRACT

VoIP networks and methods are disclosed for distributing media resources in a VoIP network for providing services. VoIP endpoints, media gateways, and/or other network nodes in the VoIP network report available media resources (i.e., available processing capacity) that are able to provide services, such as providing announcements, DTMF digit collection, etc, to a distributed resource server. The distributed resource server then assigns the available media resources among the VoIP endpoints and/or media gateways to perform services for calls in the VoIP network in order to distribute the tasks of performing services among different nodes of the VoIP network.

20 Claims, 8 Drawing Sheets

(56) References Cited

U.S. PATENT DOCUMENTS

| | | | |
|---|---|---|---|
| 7,599,473 B2* | 10/2009 | Michael et al. | 379/76 |
| 7,822,188 B1* | 10/2010 | Kirchhoff | H04M 3/436 |
| | | | 379/211.02 |
| 8,194,873 B2* | 6/2012 | Pan et al. | 381/71.11 |
| 8,291,029 B2* | 10/2012 | Asthana et al. | 709/206 |
| 8,765,722 B2* | 7/2014 | Cho et al. | 514/81 |
| 2002/0032751 A1* | 3/2002 | Bharadwaj | 709/218 |
| 2004/0015568 A1* | 1/2004 | Kaakani et al. | 709/220 |
| 2004/0076146 A1* | 4/2004 | Takahashi | H04M 1/2535 |
| | | | 370/352 |
| 2004/0114747 A1* | 6/2004 | Trandal | H04M 3/436 |
| | | | 379/211.02 |
| 2004/0120298 A1* | 6/2004 | Evans et al. | 370/338 |
| 2005/0069099 A1* | 3/2005 | Kozdon et al. | 379/88.13 |
| 2006/0067310 A1* | 3/2006 | Murai | 370/353 |
| 2006/0256778 A1* | 11/2006 | Nakamura | 370/352 |
| 2007/0140299 A1* | 6/2007 | Hofmann et al. | 370/486 |
| 2007/0198656 A1* | 8/2007 | Mazzaferri et al. | 709/218 |
| 2007/0263798 A1* | 11/2007 | Dewing et al. | 379/88.13 |
| 2008/0013704 A1* | 1/2008 | Hyerle | 379/201.1 |
| 2008/0089488 A1* | 4/2008 | Brunson et al. | 379/88.12 |
| 2010/0135473 A1* | 6/2010 | Dewing et al. | 379/88.13 |
| 2010/0211004 A1* | 8/2010 | Williams et al. | 604/78 |

* cited by examiner

DISTRIBUTED MEDIA RESOURCES IN VOIP NETWORKS FOR PROVIDING SERVICES

RELATED APPLICATIONS

This patent application claims priority to a foreign patent application filed in the Chinese Patent Office, having the application number 200710111907.5 and filed on Jun. 20, 2007.

BACKGROUND OF THE INVENTION

1. Field of the Invention

The invention is related to the field of communication networks and, in particular, to distributing the tasks of providing value-added services for calls in a VoIP network among multiple network nodes in the VoIP network. More particularly, the tasks of providing services are distributed among VoIP endpoints, media gateways, or other network nodes, instead of being provided by one or more centralized media servers.

2. Statement of the Problem

Voice over Internet Protocol (VoIP) is a technology used for the routing of voice conversations over a data network using Internet Protocol (IP). The data network may be the Internet or any other IP-based network, such as an enterprise intranet. VoIP networks are typically viewed as a lower cost alternative to traditional public switched telephone networks (PSTN).

A typical VoIP network is comprised of one or more application servers, one or more centralized media servers, one or more media gateways, and a plurality of VoIP endpoints. The application server provides call processing within the VoIP network. The media server includes media resources that are adapted to provide value-added services for calls in the VoIP network, such as playing announcements, compression/decompression (CODEC) conversion, DTMF digit collection, conferencing, ringback tones, advertising, etc. The media gateway is adapted to interface the VoIP network with a PSTN. The VoIP endpoints are network elements used to originate or terminate a call over the VoIP network, such as a VoIP phone, a PDA, a computer having VoIP capabilities, etc.

The following illustrates how a VoIP network serves a call. One of the endpoints originates a call by transmitting a signaling message (e.g., a SIP INVITE message) to the application server. Responsive to receiving the signaling message, the application server performs call processing to provide standard VoIP services and value-added services for the call, much like a switch provides telecom services and value-added services in an intelligent network. To provide value-added services, the application server processes service triggers for the value-added services to determine if a trigger condition is detected. If a trigger is detected for one or more of the value-added services, then the application server suspends call processing and transmits a request for media resources to the media server. The media resources are the facilities that provide the proper service. Responsive to receiving the request, the media server assigns the proper media resources to provide the value-added service for the call. The media server then transmits a response to the application server indicating that the service has been provided, and the application server resumes normal call processing to handle the call. A similar process is performed so that the media server may provide value-added services for other calls in the VoIP network.

One problem with present VoIP networks is that the media server(s) is responsible for providing the value-added services for the entire VoIP network through its media resources. As a result, network operators estimate a maximum media resource demand in the VoIP network for providing the value-added services during peak times, and engineer the media server or media servers to handle the maximum media resource demand. This may mean engineering the media server or media servers with high performance hardware platforms, such as high speed CPUs, large memory, and fast network interface cards (NIC), in order to handle the maximum media resource demand. However, a VoIP network rarely operates with enough traffic to reach the maximum media resource demand. Thus, the media servers may be engineered with a processing capacity that far exceeds the average media resource demand in the VoIP network, which is a waste of network resources.

SUMMARY OF THE SOLUTION

Embodiments of the invention solve the above and other related problems by distributing the tasks of providing the value-added services in a VoIP network to media resources in multiple network nodes in the VoIP network. In addition to or in place of a media server providing the value-added services, VoIP endpoints, media gateways, or other network nodes in the VoIP network are adapted to provide the value-added services. For example, VoIP endpoints (e.g., VoIP phones) are idle unless a user is placing a call through the VoIP endpoint. An average VoIP user may actually use the VoIP endpoint an hour or so a day, meaning that the VoIP endpoint is idle a majority of the time. When the VoIP endpoint is idle, the endpoint has available processing capacity in the form of idle media resources that are adapted to provide services in the VoIP network. Embodiments described herein take advantage of the idle media resources of the VoIP endpoints, and use these idle media resources to provide services in the VoIP network that were traditionally performed by media servers. As a result, service providers that deploy VoIP networks no longer need to bear the added cost of engineering a centralized media server that can handle a maximum media resource demand in the VoIP network, as the media resource demand may be distributed to VoIP endpoints and other network nodes.

In one embodiment of the invention, a VoIP network includes a plurality of VoIP endpoints (e.g., VoIP phones) and a distributed resource server. The VoIP endpoints are adapted to report available media resources to the distributed resource server. For instance, when a VoIP phone is idle, the VoIP phone may report that it has available processing capacity in the form of idle media resources. The distributed resource server is adapted to receive information on available media resources from the VoIP endpoints, and to store the information on the available media resources. The distributed resource server may also be adapted to transmit configuration parameters to the VoIP endpoints to configure the available media resources of the VoIP endpoints to provide the services. Also, the distributed resource server may be adapted to monitor the available media resources of the VoIP endpoints so that the idle/busy status of the resources is accurate. When information on the available media resources is collected, the distributed resource server is further adapted to assign the available media resources of the VoIP endpoints to provide the services for calls in the VoIP network based on the stored information. Distributed resources server may operate in a similar manner to assign media resources from other network nodes, such as media gateways.

The embodiments provided herein take advantage of the idle resources of the VoIP endpoints to provide services in the VoIP network. These idle resources would otherwise be wasted. Also, by distributing the tasks of providing services in VoIP network to VoIP endpoints, media servers in the VoIP network have less of a burden for providing the services. Media servers can thus be engineered for lower processing capacities or can be eliminated all together.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-8 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
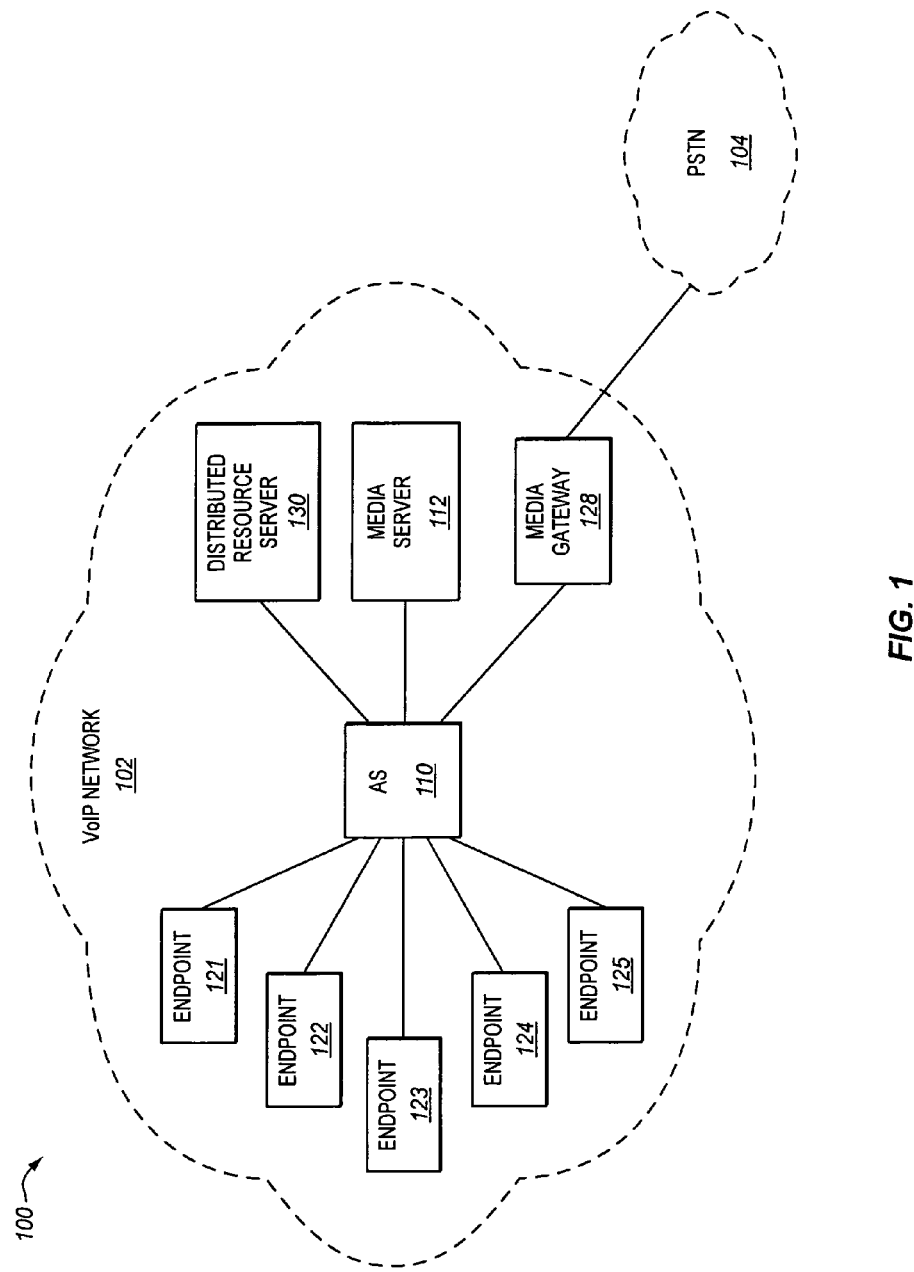
FIG. 1 illustrates a communication network in an exemplary embodiment of the invention.

FIG. 1 illustrates a communication network 100 in an exemplary embodiment of the invention. Communication network 100 includes a VoIP network 102 and a PSTN 104. VoIP network 102 includes one or more application servers 110, one or more media servers 112, a plurality of endpoints 121-125, and one or more media gateways 128. Application server (AS) 110 comprises any system or server adapted to manage endpoints in a VoIP network that register with it, and to provide call processing functionality. Media server 112 comprises any system or server adapted to provide centralized media resources to a VoIP network to provide services in the VoIP network. Media resources comprise any components, devices, code, or other systems adapted to provide services (also referred to as value-added services) in a VoIP network. The services provided by the media resources may comprise playing announcements, CODEC conversion, DTMF digit collection, conferencing, ringback tones, advertising, etc. Endpoints 121-125 (also referred to as VoIP endpoints) comprise any devices that implement functionality for initiating or terminating calls in a VoIP network. Examples of endpoints 121-125 include VoIP phones, PDAs, computers having VoIP capabilities, etc. Endpoints 121-125 may implement SIP User Agent (UA) functionality for initiating or terminating calls. Media gateway 128 comprises any system or server adapted to bridge a VoIP network with a PSTN. A functionality of media gateway 128 is to convert between the circuit voice in the PSTN and RTP media streams or other types of media streams in the VoIP network. These elements of VoIP network 102 resemble the elements of a conventional VoIP network.

One assumption herein is that endpoints 121-125 have media resources that are adapted to provide services in VoIP network 102. For instance, endpoints 121-125 may each have a processor, memory, and program instructions adapted to provide one or more services, such as DTMF digit collection. The processor, memory, and program instructions are considered media resources that are adapted to provide services. Another assumption is that media gateway 128 also has media resources that are adapted to provide services in VoIP network 102. There may be other network nodes not shown in FIG. 1 that have similar media resources.

According to this embodiment, VoIP network 102 also includes distributed resource server 130. Distributed resource server 130 comprises any system or server adapted to manage and coordinate media resources in VoIP network 102, such as media resources of endpoints 121-125, media gateway 128, and possibly other network nodes. Distributed resource server 130 may also be adapted to manage and coordinate the media resources of media server 112.

In order to manage the media resources of endpoints 121-125, they each identify their own available media resources. For instance, if endpoint 121 is idle (i.e., not presently on a call), then endpoint 121 may identify which of its media resources are available. After identifying available media resources, endpoints 121-125 transmit information on the available media resources to distributed resource server 130. Similarly, media gateway 128 identifies its own available media resources, and transmits information on the available media resources to distributed resource server 130. Other network nodes (not shown) in VoIP network 102 may operate in the same manner to report available media resources to distributed resource server 130. The information on the available media resources provided by network nodes in VoIP network 102 may describe a particular functionality or service that can be provided by the node, such as DTMF digit collection, conferencing, etc. Distributed resource server 130 then operates as described below.

Figure 2:
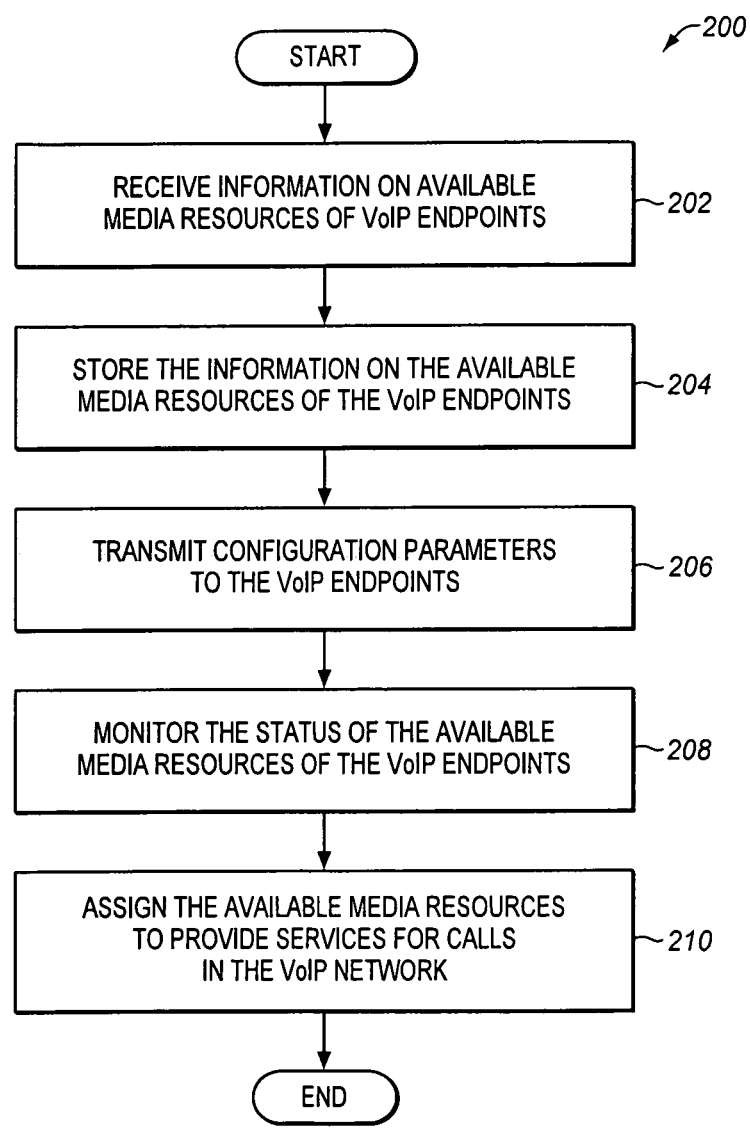
FIG. 2 is a flow chart illustrating a method of operating a distributed resource server in a VoIP network in an exemplary embodiment of the invention.

FIG. 2 is a flow chart illustrating a method 200 of operating a distributed resource server in a VoIP network in an exemplary embodiment of the invention. The steps of method 200 will be described with reference to communication network 100 in FIG. 1. The steps of the flow chart in FIG. 2 are not all inclusive and may include other steps not shown.

In step 202 of method 200, distributed resource server 130 receives the information on the available media resources of endpoints 121-125, media gateway 128, and/or other network nodes to provide services for calls in VoIP network 102. Endpoints 121-125, media gateway 128, and/or other network nodes (not shown in FIG. 1) may be collectively referred to as "other network nodes", meaning network nodes other than a media server 112. In step 204, distributed resource server 130 stores the information on the available media resources as reported by endpoints 121-125 and/or media gateway 128. Distributed resource server 130 may store the information on the available media resources in any desired data structure that allows it to monitor and track the available media resources. Distributed resource server 130 may additionally receive and store information on the available media resources of media server 112 if VoIP network 102 is configured so that media server 112 also reports available media resources to distributed resource server 130.

In step 206, distributed resource server 130 transmits configuration parameters to one or more of endpoints 121-125 and media gateway 128 that provided or reported information on their available media resources. The configuration parameters are adapted to configure the available media resources of endpoints 121-125 and/or media gateway 128 to provide the services for calls in VoIP network 102. For instance, if a service is to play an announcement, then the configuration parameters provided by distributed resource server 130 may include an audio file for the announcement or a location of the audio file that an endpoint may download.

In step 208, distributed resource server 130 monitors the status of the available media resources of endpoints 121-125 and/or media gateway 128. For instance, distributed resource server 130 may periodically transmit a status query to endpoints 121-125 and/or media gateway 128. The status query requests a status of the available media resources which distributed resource server 130 may use to update the stored information of the available media resources. Steps 206 and 208 are optional steps that may be performed in some embodiments.

As stated above, distributed resource server 130 may store the information on the available media resources in any desired data structure that allows it to monitor and track the available media resources. One such example is storing the information on the available media resources in a resource grid representing the available media resources of endpoints 121-125 and/or media gateway 128. A resource grid comprises any data structure that links together information on available media resources in VoIP network 102. The resource grid concept allows endpoints 121-125 and/or media gateway 128 to publish their available media resources to distributed resource server 130 which is essentially renting the available media resources to the resource grid. The available media resources in the resource grid can be shared in VoIP network 102 to provide services for calls.

Figure 3:
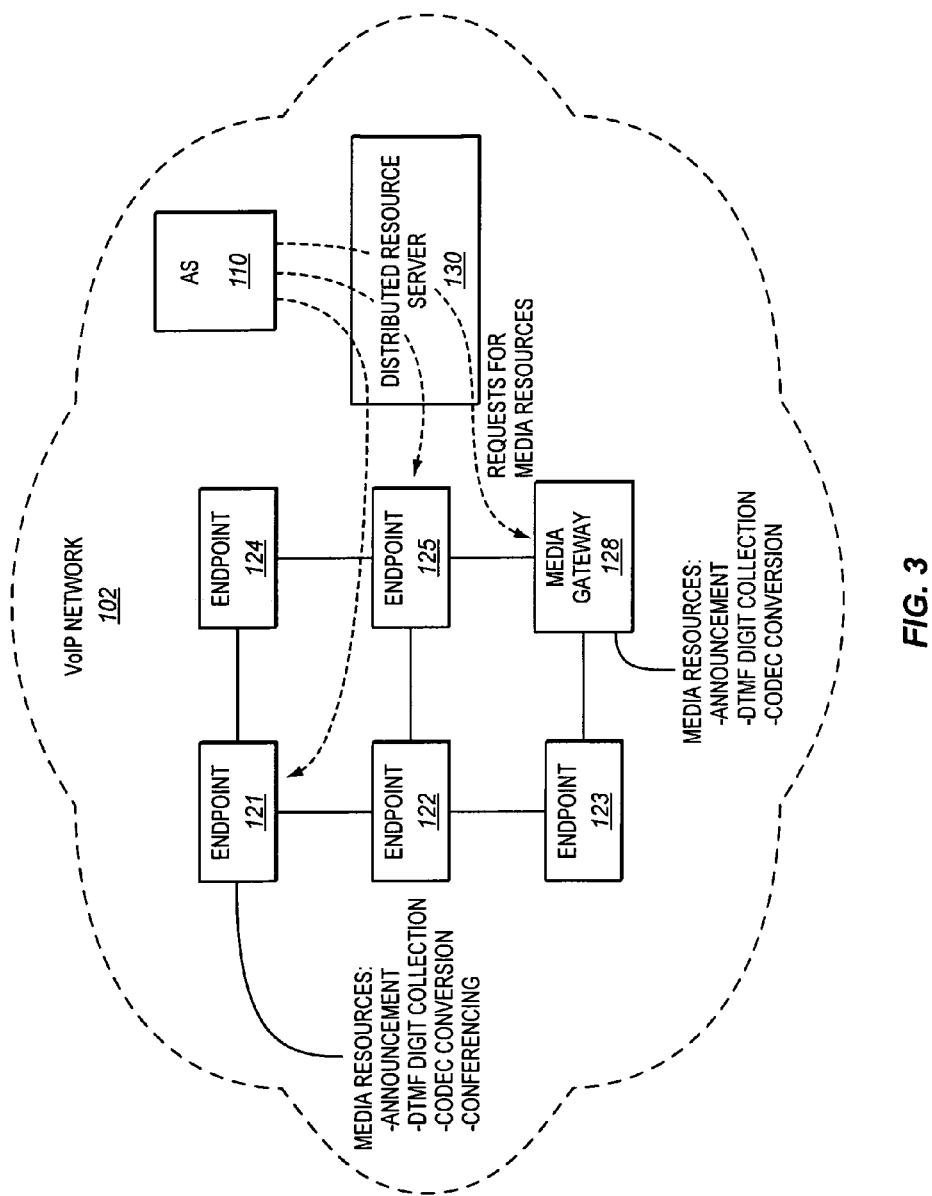
FIG. 3 illustrates a resource grid in an exemplary embodiment of the invention.

FIG. 3 illustrates a resource grid that is accessible to distributed resource server 130 in an exemplary embodiment of the invention. Along with identification information for the endpoints 121-125 and/or media gateway 128 in the resource grid, the grid also includes information on available media resources for each of endpoints 121-125 and/or media gateway 128. For instance, the resource grid indicates media resources adapted to provide announcements, DTMF digit collection, CODEC conversion, and conferencing for endpoint 121. The resource grid indicates media resources adapted to provide announcements, DTMF digit collection, and CODEC conversion for media gateway 128. This information in the resource grid is linked together so that distributed resource server 130 may manage the available resources.

When information on the available media resources has been collected and stored, distributed resource server 130 may then allocate the available media resources as needed. Assume that calls have been placed over VoIP network 102. Some or all of the calls may need services (e.g., value-added services) to be performed. Responsive to services being invoked for calls in VoIP network 102, distributed resource server 130 assigns the available media resources of endpoints 121-125 and/or media gateway 128 in a distributed fashion to provide the services based on the stored information in step 210. The available media resources in endpoints 121-125 and/or media gateway 128 may then perform the services as assigned by distributed resource server 130.

Distributed resource server 130 may assign the available media resources based on a resource grid as shown in FIG. 3. Distributed resource server 130 may first identify one or more of endpoints 121-125 and/or media gateway 128 having media resources that are capable of performing the service for the call, and then decide which media resources to assign to perform the service. Distributed resource server 130 may use different rules or protocols to decide which media resources to assign. For instance, distributed resource server 130 may assign the available media resources in the resource grid in order to balance media resource usage among endpoints 121-125 and media gateway 128. If media server 112 (see FIG. 1) is also being used to provide services, then distributed resource server 130 may also assign the available media resources in order to balance media resource usage among media server 112, endpoints 121-125, and media gateway 128. By balancing the workloads, distributed resource server 130 may create an efficient, distributed set of media resources.

Figure 4:
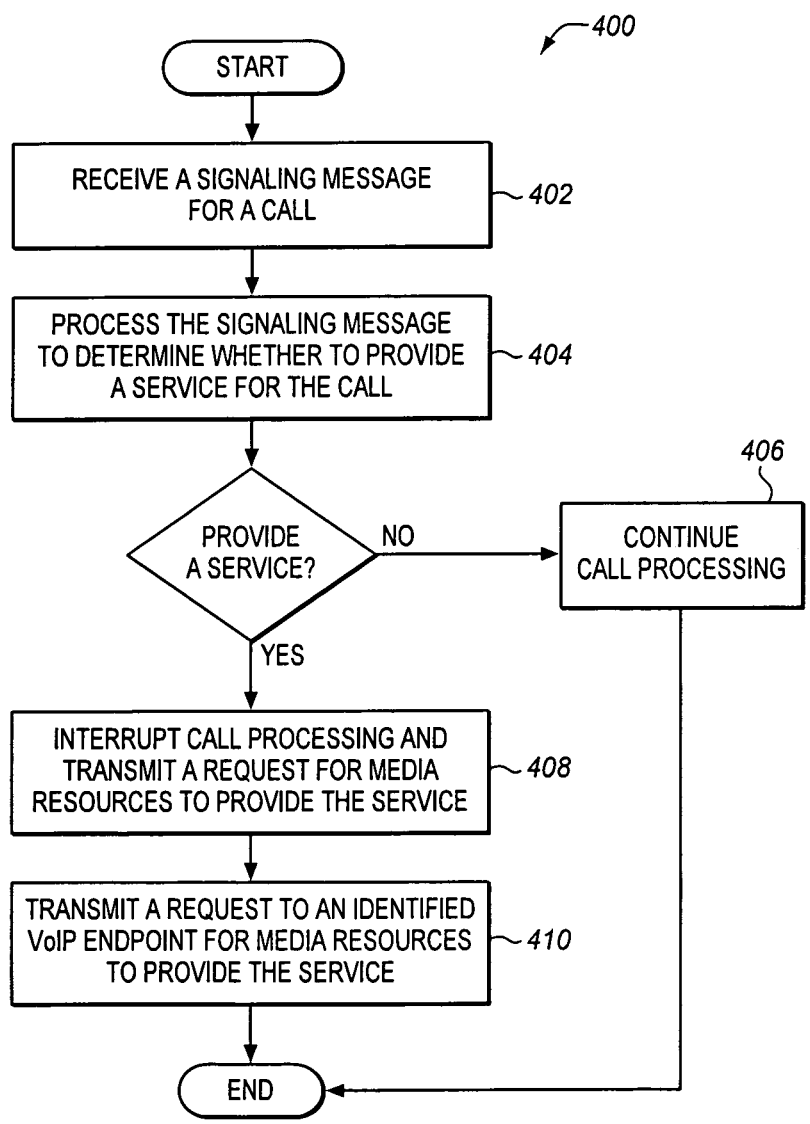
FIG. 4 is a flow chart illustrating a method of operating an application server to invoke a service for a call in an exemplary embodiment of the invention.
Figure 5:
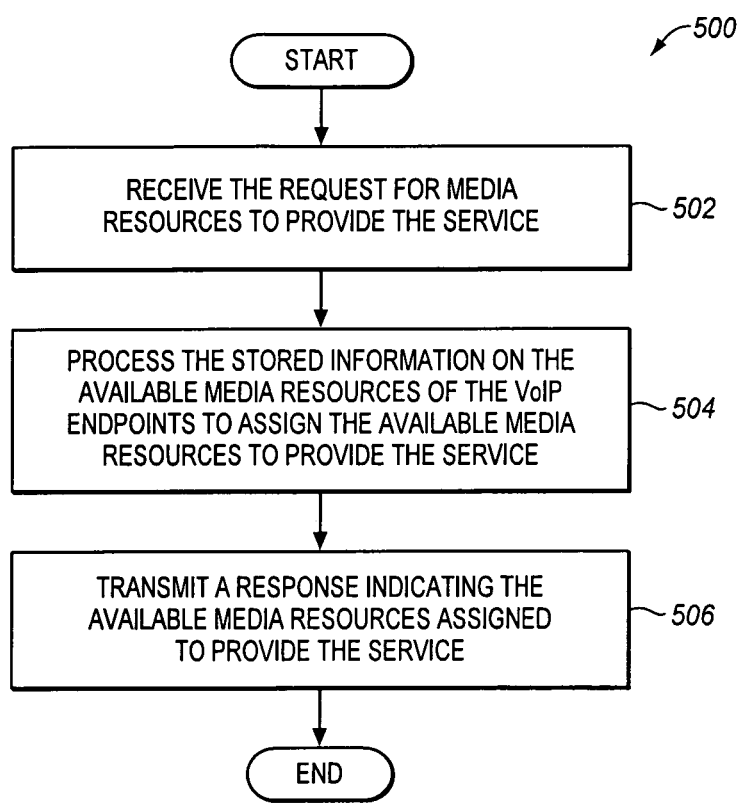
FIG. 5 is a flow chart illustrating a method of operating a distributed resource server to assign media resources to provide a service for a call in an exemplary embodiment of the invention.

FIGS. 4-5 illustrate an example of assigning available media resources to provide a service for a call as described in step 210 of method 200. Assume that a call is placed over VoIP network 102. FIG. 4 is a flow chart illustrating a method 400 of operating application server 110 to invoke a service for the call in an exemplary embodiment of the invention. In step 402 of method 400, application server 110 receives a signaling message for the call. The signaling message may be from one of endpoints 121-125 or from another endpoint or communication device not shown in FIG. 1. In step 404, application server 110 processes the signaling message (during call processing) to determine whether to provide a service for the call, such as an announcement, DTMF digit collection, etc. If a determination is made not to provide a service, then application server 110 continues call processing in step 406. If a determination is made to provide a service, then application server 110 interrupts call processing and transmits a request for media resources to distributed resource server 130 in step 408. The request is for distributed resource server 130 to allocate or assign media resources in endpoints 121-125 or media gateway 128 to provide the service.

FIG. 5 is a flow chart illustrating a method 500 of operating distributed resource server 130 to assign media resources to provide a service for the call in an exemplary embodiment of the invention. In step 502 of method 500, distributed resource server 130 receives the request for media resources from application server 110. In step 504, distributed resource server 130 processes the stored information on the available media resources of endpoints 121-125 and/or media gateway 128 to assign available media resources from one or more of endpoints 121-125 and/or media gateway 128. These assigned available media resources will provide the service. For instance, distributed resource server 130 may assign available media resources from endpoint 121 to provide a service such as playing an announcement. In another instance, distributed resource server 130 may assign available media resources from media gateway 128 to provide a service such as DTMF digit collection. In step 506, distributed resource server 130 transmits a response to application server 110 indicating the available media resources assigned to provide the service for the call.

In FIG. 4, application server 110 then transmits a request for the assigned media resources to provide the service for the call in step 410. A similar process may be performed to provide services for other calls in VoIP network 102.

VoIP network 102 as described in the above embodiment provides advantages over prior VoIP networks. Instead of relying on one or more media servers to provide services for calls in a VoIP network, VoIP network 102 distributes the tasks of providing the services to other network nodes, such as endpoints 121-125 and media gateway 128, in addition to or in place of media server 112. VoIP network 102 is thus not reliant on a centralized media server but uses media resources in multiple network nodes creating a distributed virtual media server.

Also, VoIP network 102 takes advantage of the idle resources of endpoints 121-125 and/or media gateway 128 to provide services. Endpoints 121-125 (e.g., VoIP phones) are idle unless users are placing calls through the endpoints. An average VoIP user may actually use a VoIP phone an hour or so a day, meaning that the VoIP phone is idle a majority of the time. When the VoIP phone is idle, the phone has available processing capacity in the form of idle media resources that are adapted to provide services in VoIP network 102. VoIP network 102 takes advantage of the idle media resources of the VoIP phone, and uses these idle media resources to provide services that were traditionally performed by media server 112. These idle resources of a VoIP phone would otherwise be wasted.

Further, as more endpoints are added to VoIP network 102, more available media resources are also added. Because the average endpoint is idle more often than it is busy (e.g., on a call), each endpoint that is added to VoIP network 102 consequently adds available processing capacity. VoIP network 102 can thus grow without having to add more and faster media servers to provide services, as the endpoints that are added to VoIP network 102 have the media resources needed to provide the services.

The following is an example of an endpoint 121 providing a service in VoIP network 102. Assume in FIG. 1 that a call has been initiated over VoIP network 102. Further assume that endpoint 121 is a VoIP phone that has available media resources that are able to provide announcements for calls, and that endpoint 121 has reported these available media resources to distributed resource server 130. If an announcement should be played for the call, then distributed resource server 130 may assign the available media resources from endpoint 121 to play the announcement. Endpoint 121 is then able to provide the announcement for the call. Media resources in endpoint 121 are traditionally only available to the user of endpoint 121, which means that a majority of the time the media resources are idle. Endpoint 121 on average has available media resources to provide the announcement which relieves the burden of media server 112 to provide the announcement. Media server 112 may thus be engineered to handle a much lower media resource demand than before, or may even be eliminated if the other network nodes provide sufficient available media resources to handle all services needed in VoIP network 102.

In order to allow endpoints 121-125 and/or media gateway. 128 to report information on available media resources and to allow distributed resource server 130 to monitor the available media resources, a new interface is defined in the following embodiment. The interface may be formatted in XML and carried in the SIP OPTIONS message and the SIP 200 OK message. The following commands are proposed for media resource coordination between distributed resource server 130 and endpoints 121-125 and/or media gateway 128. A first command is a "Publish" command that is sent by endpoints 121-125 and/or media gateway 128 to announce media resource availability details to distributed resource server 130. A second command is a "Configure" command sent by distributed resource server 130 to endpoints 121-125 and/or media gateway 128 in order to configure parameters of the media resources on these nodes. The Configure command may also be used to instruct endpoints 121-125 and/or media gateway 128 to download announcement files from distributed resource server 130. A third command is the "Poll" command that is sent by distributed resource server 130 periodically to endpoints 121-125 and/or media gateway 128 in order to query the status of the media resources on these nodes.

The following is an example of a Publish command (request) carried in a SIP OPTIONS message that is transmitted from an endpoint (e.g., endpoint 121) to distributed resource server 130. The new data in the SIP OPTIONS message is indicated in bold.

```
OPTIONS sip: voipnetwork.com:5060;user=phone SIP/2.0
Via: SIP/2.0/UDP 10.86.9.26:5060;branch=z9hG4bK421eb
From: "SIP EP" <sip:1111@voipnetwork.com:5060>;tag=15c31
To: "Distributed Resource Server"
<sip:mediagrid@voipnetwork.com:5060>
Call-ID: UNSET000.20050224.073704.1@10.86.9.26
CSeq: 1234 OPTIONS
Supported: timer
Expires: 3600
Contact: <sip:10.86.9.26:5060>
Content-Type: application/media-grid-management+xml
Content-Length: 470
<?xml version="1.0" encoding="UTF-8>
<PUBLISH token="TokenA">
  <Resource id="1" type="Announcement">
      <codec>G711.a-law</codec>
      <codec>G711.u-law</codec>
      <ann_file>promptForBridgeNumber.mp3</ann_file>
      <status>IDLE</status>
  </Resource>
  <Resource id="2" type="DTMF_Buffer">
      <codec>G711.a-law</codec>
      <codec>G711.u-law</codec>
      <firstDigitTimer>5</firstDigitTimer>
      <interDigitTimer>2</interDigitTimer>
      <stopDigit>#</stopDigit>
      <status>IDLE</status>
  </Resource>
</PUBLISH>
```

The following is an example of a Publish command (response) carried in a SIP 200 OK message that is transmitted from distributed resource server 130 to an endpoint (e.g., endpoint 121). The new data in the SIP 200 OK message is indicated in bold.

```
SIP/2.0 200 OK
Via: SIP/2.0/UDP 10.86.9.26:5060;branch=z9hG4bK421eb
From: "SIP EP" <sip:1111@voipnetwork.com:5060>;tag=15c31
To: "Distributed Resource Server"
<sip:mediagrid@voipnetwork.com:5060>
Call-ID: UNSET000.20050224.073704.1@10.86.9.26
CSeq: 1234 OPTIONS
Contact: <sip:7135521@10.86.9.26:5060;user=phone>
Content-Type: application/ media-grid-management+xml
```

```
Content-Length: 77
<?xml version="1.0" encoding="UTF-8>
<PUBLISH>
   <result status="OK"/>
</PUBISH>
```

Figure 6:
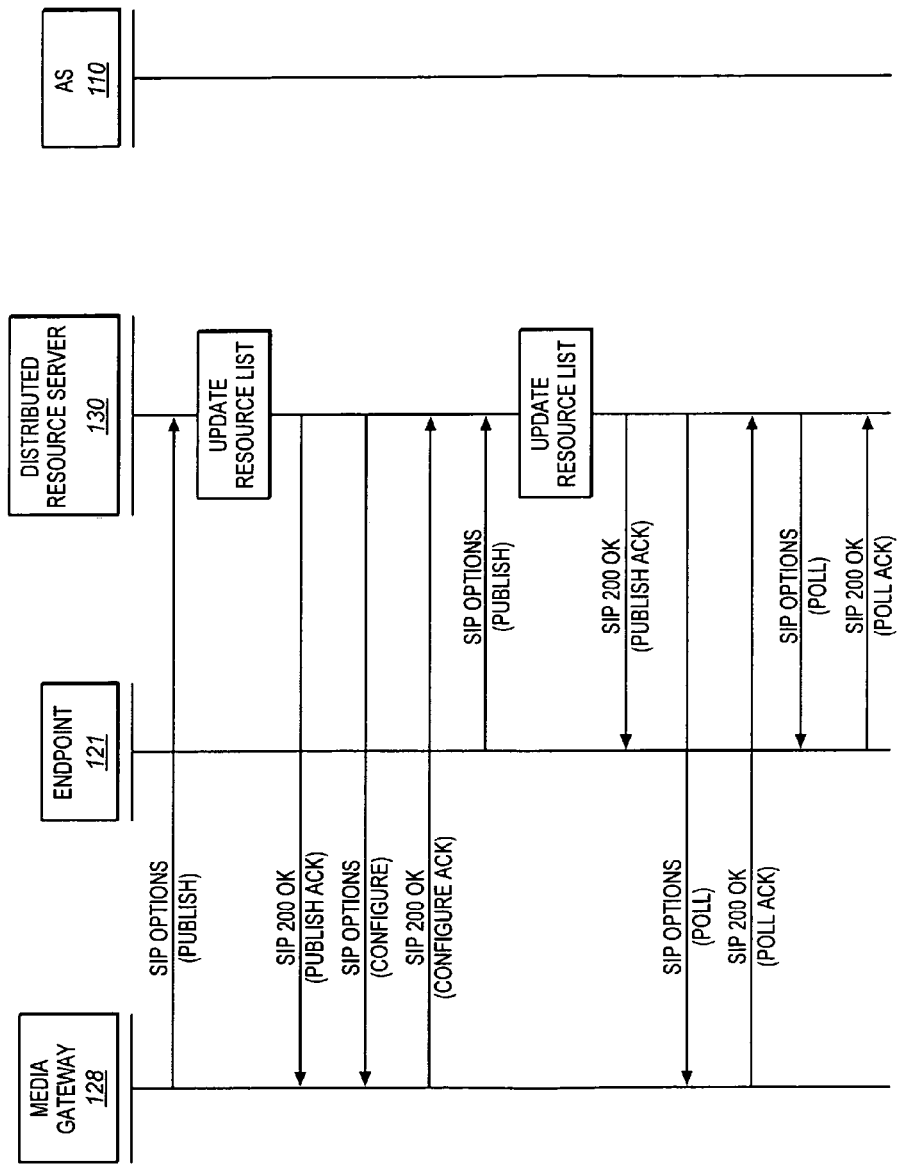
FIG. 6 is a message diagram illustrating the messaging used for network nodes reporting available media resources to a distributed resource server in an exemplary embodiment of the invention.

The following illustrates some examples of the messaging used to provide the distributed media resources as described herein. FIG. 6 is a message diagram illustrating the messaging used for network nodes reporting available media resources to distributed resource server 130 in an exemplary embodiment of the invention. In this embodiment, media gateway 128 reports its announcement playing functionality and DTMF digit collection functionality to distributed resource server 130, and endpoint 121 reports its conference resources to distributed resource server 130. The messaging used in this example is SIP, but other messaging protocols may be used in other embodiments.

To begin, media gateway 128 publishes its available media resources to distributed resource server 130 by transmitting a SIP OPTIONS message to distributed resource server 130. As described in an above embodiment, the SIP OPTIONS message includes a Publish command in the XML data of the OPTIONS message. In this embodiment, the available media resources for media gateway 128 provide DTMF digit collection and announcement functionality. Media gateway 128 also publishes its token (e.g., some type of identifier), which will be later used by the media resource user for verification purposes. Responsive to the SIP OPTIONS message, distributed resource server 130 adds the media gateway information to an available media-resource list. Distributed resource server 130 then acknowledges media gateway 128 by transmitting a SIP 200 OK message to media gateway 128. The SIP 200 OK message includes the Publish response.

Distributed resource server 130 then transmits a SIP OPTIONS message to media gateway 128. The SIP OPTIONS message includes a Configure command in the XML data of the OPTIONS message. In this embodiment, the Configure command is used to setup resource parameters and/or upload announcements files. Media gateway 128 applies the configurations and/or saves the announcement files locally. Media gateway 128 then acknowledges distributed resource server 130 by transmitting a SIP 200 OK message to distributed resource server 130. The SIP 200 OK message includes the Configure response.

In a similar manner to media gateway 128, endpoint 121 publishes its available media resources to distributed resource server 130 by transmitting a SIP OPTIONS message to distributed resource server 130. The SIP OPTIONS message includes a Publish command in the XML data of the OPTIONS message. In this embodiment, the available media resources for endpoint 121 provide conference functionality, so endpoint 121 reports information such as a supported number of conference channels, CODECs, etc. Endpoint 121 also publishes its token, which will be later used by the media resource user for verification purposes. Responsive to the SIP OPTIONS message, distributed resource server 130 adds the endpoint information to the available media resource list. Distributed resource server 130 may bind endpoint 121 to a conference b ridge number statically or dynamically. Distributed resource server 130 then acknowledges endpoint 121 by transmitting a SIP 200 OK message to endpoint 121. The SIP 200 OK message includes the Publish response.

Distributed resource server 130 then monitors the media resource status by periodically polling endpoint 121 and media gateway 128. To monitor the media resource status, distributed resource server 130 transmits a SIP OPTIONS message to endpoint 121 and to media gateway 128. The SIP OPTIONS messages include a Poll command in the XML data of the OPTIONS messages. Endpoint 121 and media gateway 128 then acknowledge distributed resource server 130 by transmitting a SIP 200 OK message to distributed resource server 130. The SIP 200 OK messages include Poll responses indicating the present status of the available media resources in endpoint 121 and media gateway 128.

Figure 7:
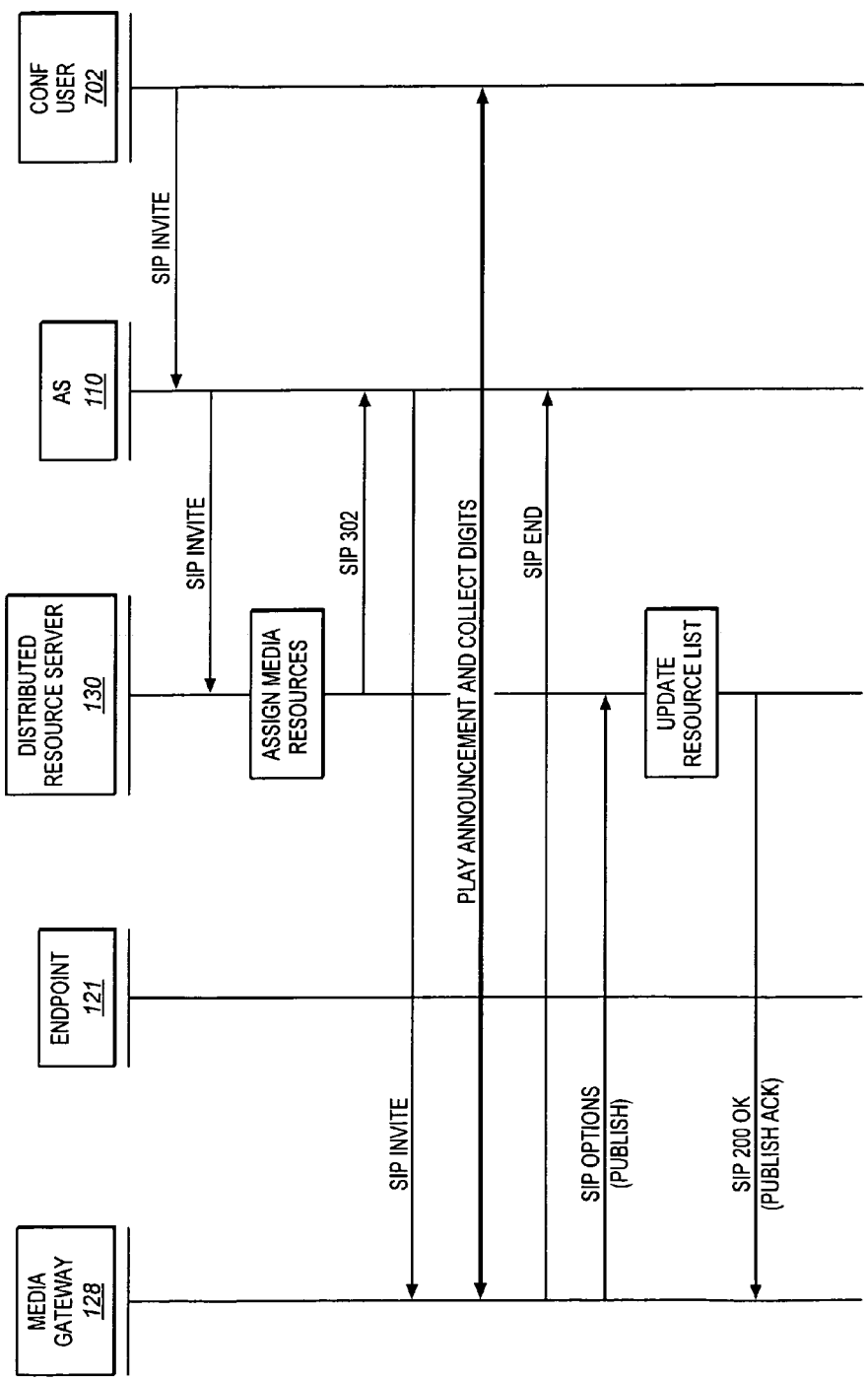
FIGS. 7-8 are message diagrams illustrating the messaging used for a conference scenario in an exemplary embodiment of the invention.
Figure 8:
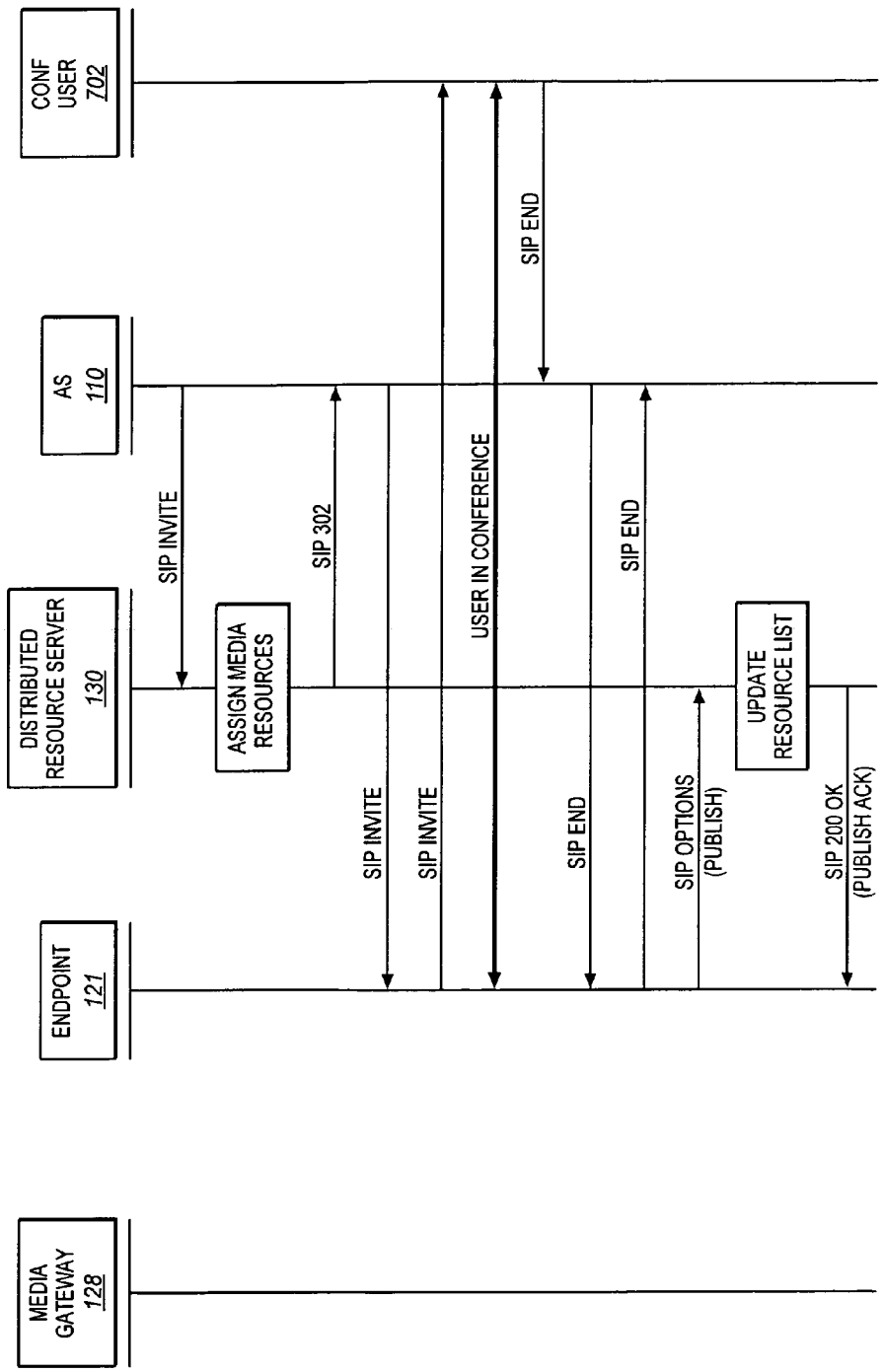

FIGS. 7-8 are message diagrams illustrating the messaging used for a conference scenario in an exemplary embodiment of the invention. In FIG. 7, media resources in media gateway 128 are adapted to provide DTMF digit collection functionality and announcement functionality to prompt a conference user 702 and collect the bridge number as dialed by conference user 702. Again, the messaging used in this embodiment is SIP, but other messaging protocols may be used in other embodiments.

To begin, application server 110 receives a SIP INVITE message from conference user 702 to join a conference. Responsive to receiving the SIP INVITE message, application server 110 processes the INVITE message to perform call processing. While processing the INVITE message, application server 110 identifies trigger conditions to invoke the services of playing an announcement and DTMF digit collection. As a result, application server 110 transmits a SIP INVITE (or MSCML) message to distributed resource server 130 requesting media resources to provide the announcement and perform DTMF digit collection.

Responsive to the SIP INVITE message, distributed resource server 130 processes the media resource list to assign available media resources to provide the services requested by application server 110. In this embodiment, distributed resource server 130 assigns available media resources in media gateway 128 to provide the announcement and DTMF digit collection. Distributed resource server 130 also indicates in the media resource list that the media resources in media gateway 128 that were assigned to provide the service are busy. Distributed resource server 130 then transmits a SIP 302 "Move Temporarily" redirect response message to application server 110 identifying the assigned media resources. The 302 message includes media resource information such as a SIP URL, IP address, a port, CODEC, an announcement ID, etc. The 302 message may also include a token that was previously generated by the media resource owner for validation purposes.

Application server 110 then transmits a SIP INVITE message to media gateway 128 to request to connect to the media resources assigned by distributed resource server 130. The INVITE message includes information on the services requested to be provided by the media resources in media gateway 128, which are playing an announcement and performing DTMF digit collection. The INVITE message also includes a token to allow media gateway 128 to validate the request.

Responsive to receiving the INVITE message, media gateway 128 verifies the request for media resources by checking the token embedded in the SIP URL of the INVITE message. Media gateway 128 then plays the requested announcement and collects the DTMF digits. Upon completion of the service, media gateway 128 transmits a SIP END message to application server 110 to end the service session. The END message also includes the digits collected by media gateway 128.

Media gateway 128 again publishes its available media resources to distributed resource server 130 by transmitting a SIP OPTIONS message to distributed resource server 130. Responsive to the SIP OPTIONS message, distributed resource server 130 updates the available media resource list to indicate that the media resources in media gateway 128 are again idle. Distributed resource server 130 then acknowledges media gateway 128 by transmitting a SIP 200 OK message to media gateway 128.

In FIG. 8, endpoint 121 is adapted to provide conference functionality for the conference. During call processing for the call, application server 110 detects a trigger to connect conference user 702 to the conference bridge. Application server 110 then transmits a SIP INVITE (or MSCML) message to distributed resource server 130 requesting media resources to serve the conference.

Responsive to the INVITE message, distributed resource server 130 processes the media resource list to assign available media resources to provide the services requested by application server 110. In this embodiment, distributed resource server 130 assigns available media resources in endpoint 121 to serve the conference. Distributed resource server 130 also indicates in the media resource list that the media resources in endpoint 121 that were assigned to provide the service as busy. Distributed resource server 130 then transmits a SIP 302 message to application server 110 identifying the assign media resources. The 302 message includes media resource information such as an IP address, a port, CODEC, etc. The 302 message may also include a token that was previously generated by the media resource owner for validation purposes.

Application server 110 then transmits a SIP INVITE message to endpoint 121 to request to connect to the media resources assigned by distributed resource server 130. The INVITE message includes information on the services requested to be provided by the media resources in endpoint 121, which are serving the conference. The INVITE message also includes a token to allow endpoint 121 to validate the request.

Responsive to receiving the INVITE message, endpoint 121 verifies the request for media resources by checking the token embedded in the SIP URL of the INVITE message. Endpoint 121 then connects conference user 702 into the conference, such as by transmitting a SIP INVITE message to conference user 702. Endpoint 121 performs a similar operation to connect other participants into the conference.

Assume at some point that conference user 702 wants to end the conference. Conference user 702 then transmits a SIP END message to endpoint 121. Endpoint 121 waits for the other participants to disconnect from the conference, and then transmits a SIP END message to application server 110 to end the service session. After the conference has ended, endpoint 121 again publishes its available media resources to distributed resource server 130 by transmitting a SIP OPTIONS message to distributed resource server 130. Responsive to the SIP OPTIONS message, distributed resource server 130 updates the available media resource list to indicate that the media resources in endpoint 121 are again idle. Distributed resource server 130 then acknowledges endpoint 121 by transmitting a SIP 200 OK message to endpoint 121.

Although specific embodiments were described herein, the scope of the invention is not limited to those specific embodiments. The scope of the invention is defined by the following claims and any equivalents thereof.

We claim:

1. A VoIP network, comprising:
a plurality of VoIP endpoints, each VoIP endpoint comprising at least one media resource adapted to provide services for calls in the VoIP network; and
a distributed resource server adapted to receive information on media resources from available VoIP endpoints of the plurality that are not presently servicing a call, to store the information on the media resources of the available VoIP endpoints, and to assign the media resources of the available VoIP endpoints to provide the services for a call between a first and a second VoIP endpoint that are presently unavailable for providing services via the distributed resource server in the VoIP network, based on the stored information.

2. The VoIP network of claim 1 wherein:
the distributed resource server is further adapted to transmit configuration parameters to the available VoIP endpoints to configure the media resources of the available VoIP endpoints to provide the services for calls in the VoIP network.

3. The VoIP network of claim 1 wherein:
the distributed resource server is further adapted to monitor a status of the media resources of the available VoIP endpoints.

4. The VoIP network of claim 1 further comprising:
an application server adapted to receive a signaling message for a call in the VoIP network, to process the signaling message to determine whether to provide a service for the call, and to transmit a request for media resources to the distributed resource server responsive to a determination to provide the service for the call.

5. The VoIP network of claim 4 wherein:
the distributed resource server is further adapted to receive the request for media resources from the application server, to process the stored information on the media resources of the available VoIP endpoints to assign media resources of an identified available VoIP endpoint to provide the service, and to transmit a response to the application server indicating the media resources of the identified VoIP endpoint assigned to provide the service for the call; and
the application server is adapted to transmit a request to the identified VoIP endpoint for the assigned media resources to provide the service for the call.

6. The VoIP network of claim 1 wherein:
the available VoIP endpoints are adapted to identify media resources, and to transmit the information on the media resources to the distributed resource server.

7. The VoIP network of claim 1 further comprising at least one media gateway having media resources adapted to provide services for calls in the VoIP network, wherein the distributed resource server is further adapted to:
receive information on available media resources of the at least one media gateway, to store the information on the available media resources of the at least one media gateway, and to assign the available media resources of the at least one media gateway to provide the services for calls in the VoIP network based on the stored information.

8. A method of operating a VoIP network having a plurality of VoIP endpoints, each VoIP endpoint comprising at least one media resource adapted to provide services for calls in the VoIP network, the method comprising:
receiving, in a distributed resource server, information on media resources from available VoIP endpoints that are not presently servicing a call and are able to provide services for calls in the VoIP network;

storing the information on the media resources of the available VoIP endpoints; and assigning the media resources of the available VoIP endpoints to provide the services for a call between a first and a second VoIP endpoint that are presently unavailable for providing services via the distributed resource server in the VoIP network, based on the stored information.

9. The method of claim 8 further comprising:

transmitting configuration parameters from the distributed resource server to the available VoIP endpoints to configure the media resources of the available VoIP endpoints to provide the services for calls in the VoIP network.

10. The method of claim 8 further comprising:

monitoring a status of the media resources of the available VoIP endpoints.

11. The method of claim 8 further comprising:

receiving, in an application server, a signaling message for a call in the VoIP network;

processing the signaling message to determine whether to provide a service for the call; and transmitting a request for media resources from the application server to the distributed resource server responsive to a determination to provide the service for the call.

12. The method of claim 11 further comprising:

receiving, in the distributed resource server, the request for media resources from the application server;

processing the stored information on the media resources of the available VoIP endpoints to assign media resources of an identified available VoIP endpoint to provide the service;

transmitting a response from the distributed resource server to the application server indicating the assigned media resources of the identified VoIP endpoint; and transmitting a request from the application server to the identified VoIP endpoint for the assigned media resources to provide the service for the call.

13. The method of claim 8 further comprising:

identifying media resources in the available VoIP endpoints; and transmitting the information on the media resources from the available VoIP endpoints to the distributed resource server.

14. The method of claim 8 further comprising:

receiving, in the distributed resources server, information on available media resources of at least one media gateway to provide services for calls in the VoIP network;

storing the information on the available media resources of the at least one media gateway; and assigning the available media resources of the at least one media gateway to provide the services for calls in the VoIP network based on the stored information.

15. A method of operating a distributed resource server in a VoIP network having at least one media server defining a first network node, and having a plurality of VoIP endpoints and at least one media gateway defining other network nodes, the network nodes comprising at least one media resource adapted to provide services for calls in the VoIP network, the method comprising:

receiving information on media resources from the other network nodes that are that are not presently servicing a call and are available to provide services for calls in the VoIP network;

storing the information on the media resources of the available other network nodes; and assigning the media resources of the available other network nodes based on the stored information to provide the services for a call between a first and a second VoIP endpoint that are presently unavailable for providing services via the distributed resource server in the VoIP network.

16. The method of claim 15 further comprising:

transmitting configuration parameters to the other network nodes to configure the media resources of the available other network nodes to provide the services for calls in the VoIP network.

17. The method of claim 15 further comprising:

periodically transmitting a status query to the available other network nodes requesting a status of the media resources; and updating the stored information based on the status of the media resources.

18. The method of claim 15 further comprising:

receiving a request for media resources from an application server responsive to the application server identifying a need to provide a service for a call in the VoIP network;

assigning media resources of an identified available other network node based on the stored information to provide the service for the call in the VoIP network; and transmitting a response to the application server indicating the assigned media resources of the identified other network node.

19. The method of claim 15 wherein:

storing the information on the media resources of the available other network nodes comprises storing the information in a resource grid that represents the media resources of the available other network nodes; and assigning the media resources based on the stored information comprises assigning the media resources in the resource grid in order to balance media resource usage among the available other network nodes.

20. The method of claim 19 wherein assigning the media resources in the resource grid in order to balance media resource usage among the available other network nodes further comprises:

assigning the media resources in order to balance media resource usage among the at least one media server and the available other network nodes.

* * * * *